United States Patent
Vorenkamp et al.

(10) Patent No.: US 7,593,832 B2
(45) Date of Patent: *Sep. 22, 2009

(54) ENERGY EFFICIENT ACHIEVEMENT OF INTEGRATED CIRCUIT PERFORMANCE GOALS

(75) Inventors: Pieter Vorenkamp, Laguna Niguel, CA (US); Neil Y. Kim, Laguna Niguel, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/865,417

(22) Filed: Oct. 1, 2007

(65) Prior Publication Data

US 2008/0033694 A1    Feb. 7, 2008

Related U.S. Application Data

(63) Continuation of application No. 11/157,547, filed on Jun. 21, 2005, now Pat. No. 7,295,949.

(60) Provisional application No. 60/583,311, filed on Jun. 28, 2004.

(51) Int. Cl.
G05B 19/00 (2006.01)
G05B 21/00 (2006.01)
G06F 19/00 (2006.01)
G06F 17/40 (2006.01)

(52) U.S. Cl. .............. 702/182; 700/1; 700/28; 700/29; 700/30; 700/32; 700/33; 700/90; 700/108; 700/111; 700/297; 713/300; 713/330; 713/340

(58) Field of Classification Search ............ 700/1, 700/28, 29, 30, 31, 32, 33, 34, 36, 90, 108, 700/111, 297; 702/1, 127, 182, 186; 705/7, 705/11, 400; 713/300, 330, 340
See application file for complete search history.

(56) References Cited

U.S. PATENT DOCUMENTS

| | | | |
|---|---|---|---|
| 3,446,946 A | | 5/1969 | Andeen |
| 5,021,679 A | | 6/1991 | Fairbanks et al. |
| 5,483,471 A | | 1/1996 | Adachi |
| 5,552,694 A | * | 9/1996 | Appeltans .............. 323/222 |

(Continued)

FOREIGN PATENT DOCUMENTS

GB          2395310 A       5/2004

(Continued)

*Primary Examiner*—Edward R Cosimano
(74) *Attorney, Agent, or Firm*—McAndrews, Held & Malloy, Ltd.

(57) ABSTRACT

A system and method for meeting performance goals in an electronic system in an energy efficient manner. Various aspects of the present invention may comprise operating an electrical circuit at a current level of performance and a current level of energy efficiency by providing the electrical circuit with electrical power characterized by a current set of power characteristics (e.g., utilizing a power control module). The current level of performance may be determined (e.g., by a performance monitor) and compared to a desired level of performance (e.g., by the power control module). If the current level of performance is higher than the desired level of performance, then the electrical circuit may be operated at a next (e.g., lower) level of performance and a next (e.g., higher) level of energy efficiency by providing the electrical circuit with electrical power characterized by a next set of power characteristics.

40 Claims, 3 Drawing Sheets

U.S. PATENT DOCUMENTS

| | | | |
|---|---|---|---|
| 5,806,011 A | 9/1998 | Azzaro et al. | |
| 6,513,124 B1 | 1/2003 | Furuichi et al. | |
| 6,574,740 B1 | 6/2003 | Odaohhara et al. | |
| 6,718,358 B1 | 4/2004 | Bigus et al. | |
| 6,798,086 B2 * | 9/2004 | Utsunomiya | 307/154 |
| 6,925,573 B2 * | 8/2005 | Bodas | 713/320 |
| 6,967,522 B2 * | 11/2005 | Chandrakasan et al. | 327/534 |
| 7,100,061 B2 * | 8/2006 | Halepete et al. | 713/322 |
| 7,134,031 B2 * | 11/2006 | Flautner | 713/322 |
| 7,148,667 B2 * | 12/2006 | Umemoto et al. | 323/282 |
| 2002/0049920 A1 | 4/2002 | Staiger | |
| 2002/0135416 A1 * | 9/2002 | Hashiguchi | 327/538 |
| 2002/0138159 A1 * | 9/2002 | Atkinson | 700/21 |
| 2002/0138778 A1 | 9/2002 | Cole et al. | |
| 2002/0194513 A1 | 12/2002 | Ishibashi et al. | |
| 2003/0126478 A1 | 7/2003 | Burns et al. | |
| 2003/0126479 A1 | 7/2003 | Burns et al. | |
| 2004/0117680 A1 | 6/2004 | Naffziger | |
| 2004/0207375 A1 * | 10/2004 | Umemoto et al. | 323/282 |
| 2005/0034002 A1 * | 2/2005 | Flautner | 713/322 |
| 2005/0138438 A1 * | 6/2005 | Bodas | 713/300 |
| 2007/0057650 A1 * | 3/2007 | Umemoto et al. | 323/234 |

FOREIGN PATENT DOCUMENTS

| | | |
|---|---|---|
| JP | 60-216243 A | 10/1985 |
| JP | 61-97056 A | 5/1986 |

* cited by examiner

ENERGY EFFICIENT ACHIEVEMENT OF INTEGRATED CIRCUIT PERFORMANCE GOALS

CROSS-REFERENCE TO RELATED APPLICATIONS/INCORPORATION BY REFERENCE

This patent application is a continuation of U.S. patent application Ser. No. 11/157,547, filed on Jun. 21, 2005, now U.S. Pat. No. 7,295,949, which makes reference to, claims priority to and claims benefit from expired U.S. provisional patent application Ser. No. 60/583,311, filed Jun. 28, 2004, and entitled "ENERGY EFFICIENT ACHIEVEMENT OF INTEGRATED CIRCUIT PERFORMANCE GOALS". The contents of each of the aforementioned patent applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In many electronic circuits and system, high performance operation is a driving design factor. Such high performance operation is often related to relatively high amounts of energy consumption. For example, depending on the nature of the electronics, high performance operation may be related to high voltage and/or high current operation.

Some electrical circuits may exhibit high performance behavior when such high performance is unnecessary. Unnecessarily high performance operation may result in a significant amount of wasted energy, both in the electrical circuit and in circuitry providing the energy. Additionally, unnecessarily high performance operation may result in higher than necessary amounts of heat, which may shorten the life span of electrical components and require that larger amounts of circuit space be devoted to heat dissipation features.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for meeting performance goals in an electronic system in an energy efficient manner, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
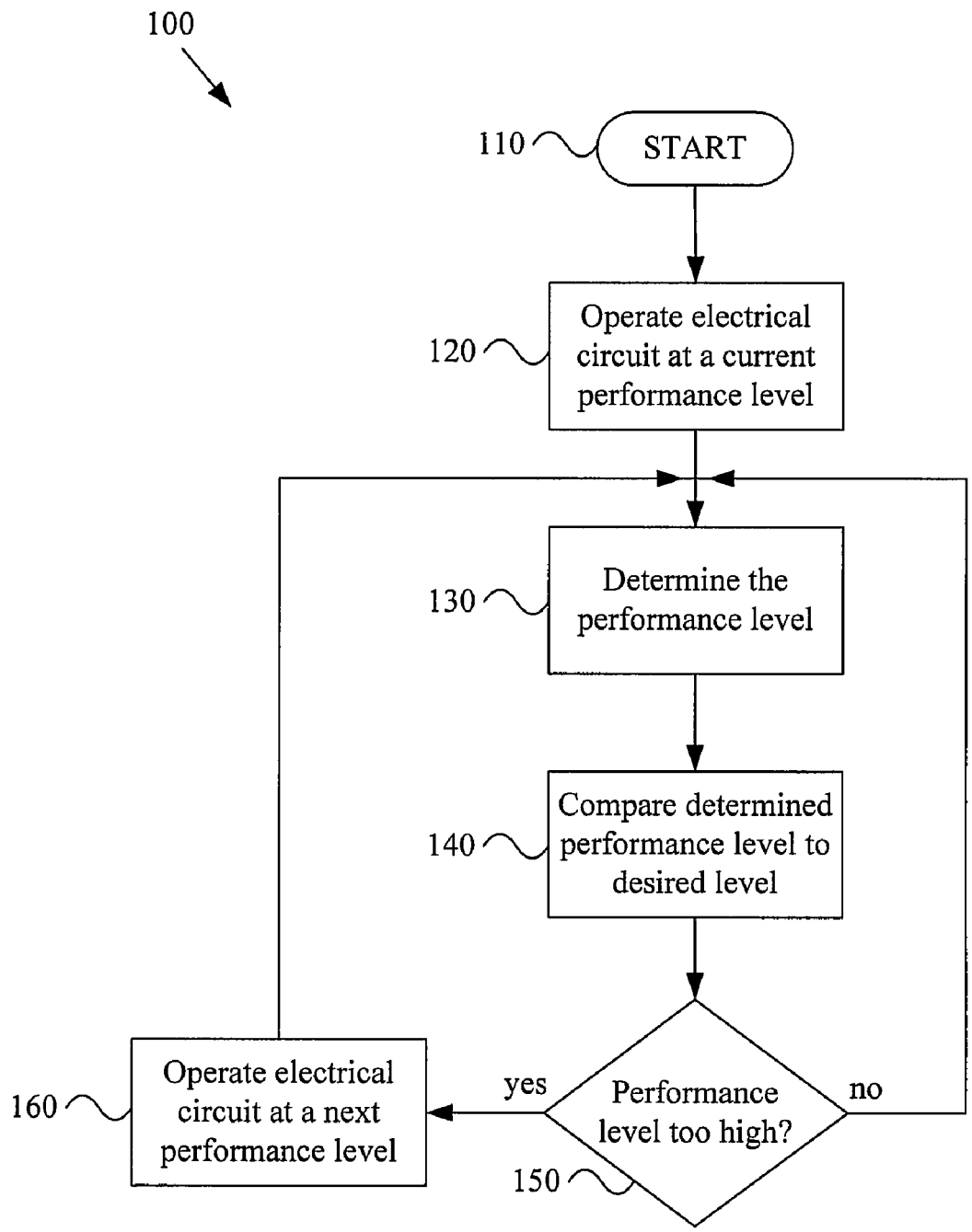
FIG. 1 illustrates an exemplary method for providing a desired electrical circuit performance level in an energy efficient manner, in accordance with various aspects of the present invention

FIG. 1 illustrates an exemplary method 100 for providing a desired electrical circuit performance level in an energy efficient manner, in accordance with various aspects of the present invention. The exemplary method 100 may begin at step 110. The method 100 may be initiated in response to any of a variety of causes or conditions. For example and without limitation, the method 100 may be initiated on system or circuit start-up or reset. Also for example, the method 100 may be initiated on command or with the application of electrical power to a system or circuit. Additionally, for example, the method 100 may be initiated in response to a condition detected in the system or circuit that warrants an assessment of energy utilization in the system. The method 100 may, for example, operate once, periodically, or continuously. In general, the method 100 may be initiated for any of a variety of reasons. Accordingly, the scope of various aspects of the present invention should not be limited by characteristics of particular initiating conditions or by characteristics of continued processing behavior.

The method 100 may, at step 120, comprise operating an electrical circuit at a current level of performance and a current level of energy efficiency by providing the electrical circuit with electrical power characterized by a current set of power characteristics.

An electrical circuit may comprise characteristics of any of a large variety of electrical circuits and systems. For example and without limitation, the electrical circuit may be an integrated circuit or a module of a multi-module integrated circuit. The electrical circuit may comprise a plurality of integrated circuits and/or other discrete electrical components. The electrical circuit may comprise any of a large variety of electrical circuit types (e.g., a signal processor, decoder, encoder, converter, transmitter, receiver, microprocessor, microcontroller, audio/video driver, etc.). Accordingly, the scope of various aspects of the present invention should not be limited by characteristics of a particular electrical circuit.

The current set of power characteristics may comprise any of a large variety of electrical power characteristics. For example and without limitation, the current set of power characteristics may comprise a voltage level, current level and/or power level. The current set of power characteristics may, for example, comprise a voltage and/or current ripple or other variance level. The current set of power characteristics may, for example, comprise voltage and/or current load response characteristics. Further for example, the current set of power characteristics may comprise voltage noise characteristics. Accordingly, the scope of various aspects of the present invention should not be limited by aspects of one or more particular power characteristics.

Step 120 may, for example, comprise operating the electrical circuit at the current level of performance and the current level of energy efficiency by controlling the current set of power characteristics. For example and without limitation, step 120 may comprise generating a power control signal and communicating such a power control signal to power supply circuitry (e.g., a power management unit), where the power control signal may cause the power supply circuitry to provide electrical power having the current set of power characteristics to the electrical circuit. Such a power control signal may, for example, comprise a request or command for electrical power having a specific set of power characteristics. Alternatively, for example, such a power control signal may comprise a request or command for an adjustment to one or more of a set of power characteristics. Accordingly, the scope of various aspects of the present invention should not be limited by a particular manner of operating the electrical circuit by providing the electrical circuit with electrical power having a set of power characteristics.

The method 100 may, at step 130, comprise determining the current level of performance of the electrical circuit. Step 130 may comprise determining the current level of performance in any of a variety of manners. For example and without limitation, step 130 may comprise determining a processing speed of the electrical circuit. For example, step 130 may comprise determining a temperature of the electrical circuit. Also for example, step 130 may comprise determining a data processing rate of the electrical circuit. Such a data processing rate determination may, for example, be based on signal encoding/decoding strategy, communication protocol characteristics, identity of the communication source, a requested data rate, actual data rate, etc. Step 130 may, for example, comprise monitoring or otherwise determining an input data rate to the electrical circuit. Further for example, step 130 may comprise monitoring or otherwise determining an output data rate from the electrical circuit. Step 130 may also, for example, comprise monitoring a data buffer state (e.g., degree of buffer fullness).

In general, step 130 may comprise determining the current level of performance at which the electrical circuit is operating. Accordingly, the scope of various aspects of the present invention should not be limited by characteristics of a particular manner in which a level of performance for an electrical circuit may be determined.

The method 100 may, at step 140, comprise comparing the current level of performance (e.g., as determined at step 130) to a desired level of performance. The desired level of performance may comprise any of a variety of characteristics of electrical circuit performance. For example and without limitation, the desired level of performance may comprise any of the indications of performance discussed previously with regard to step 130. The desired level of performance may, for example, be a static or relatively static level. Such a static level of performance may, for example, be predetermined (i.e., determined prior to execution of the method 100) or determined during performance of the method 100. The desired level of performance may, for example, be dynamic. Such a dynamic level of performance may, for example be determined in real-time (e.g., in response to an operating condition, continually, etc.) or non-real-time. The desired level of performance may correspond to a single performance level or a range of performance levels.

In an exemplary scenario where step 140 comprises determining the desired performance level, step 140 may comprise determining the desired performance level based, for example, on current and/or predicted performance needs. Step 140 may, for example, comprise determining the desired performance level based on a desired signal processing speed. For example, step 140 may comprise determining the desired performance level based, at least in part, on a desired clock rate, data access time, bit rate, input data rate, output data rate, etc.

In general, step 140 may comprise comparing the current level of performance to a desired level of performance. Accordingly, the scope of various aspects of the present invention should not be limited by characteristics of a particular performance level or manner of determining a performance level.

The method 100 may, at step 150, comprise determining whether to modify the operation of the electrical circuit based on the performance level comparison performed at step 140. If for example, the determined performance level is not too high relative to the desired performance level, then execution of the method 100 may flow to step 130. Alternatively, for example, if the determined performance level is too high relative to the desired performance level, then the execution of the method 100 may flow to step 160, which effectively modifies the operation of the electrical circuit.

The method 100 may, at step 160, comprise operating the electrical circuit at a next level of performance that is different than the current level of performance and a next level of energy efficiency that is different than the current level of energy efficiency. Step 160 may, for example, operate the electrical circuit at the next level of performance by providing the electrical circuit with electrical power characterized by a next set of power characteristics that is different than the current set of power characteristics.

The next set of power characteristics may, for example and without limitation, comprise any of the power characteristics discussed previously with regard to the current set of power characteristics. For example, the next set of power characteristics may comprise one or more different voltage characteristics (e.g., voltage level, noise level, variance, ripple, load response) than the current set of power characteristics. Also for example, the next set of power characteristics may comprise one or more different electrical current characteristics (e.g., electrical current level, noise, spike attenuation, ripple, load response, etc.). Further for example, the next set of power characteristics may comprise one or more different power or energy characteristics than the current set of power characteristics. Accordingly, the scope of various aspects of the present invention should not be limited by particular power characteristics.

Step 160 may, for example, comprise operating the electrical circuit at the next level of performance at the next level of energy efficiency by controlling the next set of power characteristics. For example and without limitation, step 160 may comprise generating a power control signal and communicating such a power control signal to power supply circuitry (e.g., a power management unit), where the power control signal may cause (e.g., authoritatively or influentially) the power supply circuitry to output electrical power having the next set of power characteristics. Such a power control signal may, for example, comprise a request or command for electrical power having a specific set of power characteristics. Alternatively, for example, such a power control signal may comprise a request or command for an adjustment to one or more of a set of power characteristics. Accordingly, the scope of various aspects of the present invention should not be limited by a particular manner of operating the electrical circuit by providing the electrical circuit with electrical power having a set of power characteristics.

Step 160 may, for example, further comprise determining an adjustment to the current set of power characteristics. Such an adjustment may, for example, comprise a predetermined change in at least one of the current set of power characteristics. Also for example, step 160 may determine such an adjustment based on a profile of electrical circuit performance versus power characteristic(s). Further for example, such an adjustment may be expressed in relative or absolute terms.

In an exemplary scenario, step 160 may determine that a 0.1 Volt reduction in voltage provided to the electrical circuit may still provide for the electrical circuit to meet performance goals while resulting in higher energy efficiency. In another exemplary scenario, step 160 may determine that the electrical circuit may operate with a supplied voltage having a higher degree of ripple while still operating at or above the desired performance level. For example, such operation may correspond to lower switching loss in the power supply providing power to the electrical circuit. Note that the two previous exemplary scenarios should by no means limit the scope of various aspects of the present invention.

Further for example, step 160 may comprise determining a power characteristic adjustment based on power supply needs of a plurality of electrical sub-circuits of the electrical circuit. In an exemplary scenario, the electrical circuit may comprise a plurality of modules, each with respective power supply needs. In such an exemplary scenario, step 160 may comprise processing the respective power supply needs of the modules to determine the power characteristic adjustment. Such processing may, for example and without limitation, comprise determining the power characteristic adjustment based on the needs of the highest priority module, based on a weighted average of module priority and need, based on a straight average, or based on a determination of optimal overall energy efficiency for the plurality of modules at the desired performance level.

In another exemplary scenario, step 160 may comprise determining a power characteristic adjustment based on power supply needs of the electrical circuit and power supply needs of at least one other electrical circuit. In an exemplary scenario, the electrical circuit and other electrical circuit(s) may receive electrical power from the same power supply circuitry, and accordingly, adjustments in the power characteristics of the power that the electrical circuit receives from the power supply will affect the power characteristics of the power that the other electrical circuit(s) receives from the power supply. In the exemplary scenario, step 160 may comprise processing the respective power supply needs of the various electrical circuits to determine the power characteristic adjustment based on the needs of the electrical circuit and the other electrical circuit(s) to determine the power characteristic adjustment. Such processing may, for example and without limitation, comprise determining the power characteristic adjustment based on the needs of the highest priority circuit, based on a weighted average of circuit priority and need, based on a straight average, or based on a determination of optimal energy efficiency for the various electrical circuits at the desired performance level.

In general, step 160 may, for example, further comprise determining an adjustment to the current set of power characteristics. Accordingly, the scope of various aspects of the present invention should not be limited by characteristics of a particular next set of power characteristics, adjustment(s) made to the current set of power characteristics, or way of determining such characteristics or adjustments.

After performing step 160, the execution of the exemplary method 100 may flow back to step 130, where the present performance level may be determined again.

The method 100 may comprise performing continued processing. Such continued processing may comprise characteristics of any of a variety of types of continued processing. For example and without limitation, as exemplified in FIG. 2, such continued processing may comprise determining whether a performance level is too low and, if so, operating the electrical circuit at a next (e.g., higher) performance level.

It should be noted that the exemplary method 100 shown in FIG. 1 provides a specific illustration of various more general aspects of the present invention. Accordingly, the scope of various aspects of the present invention should by no means be limited by characteristics of the exemplary method 100.

Figure 2:
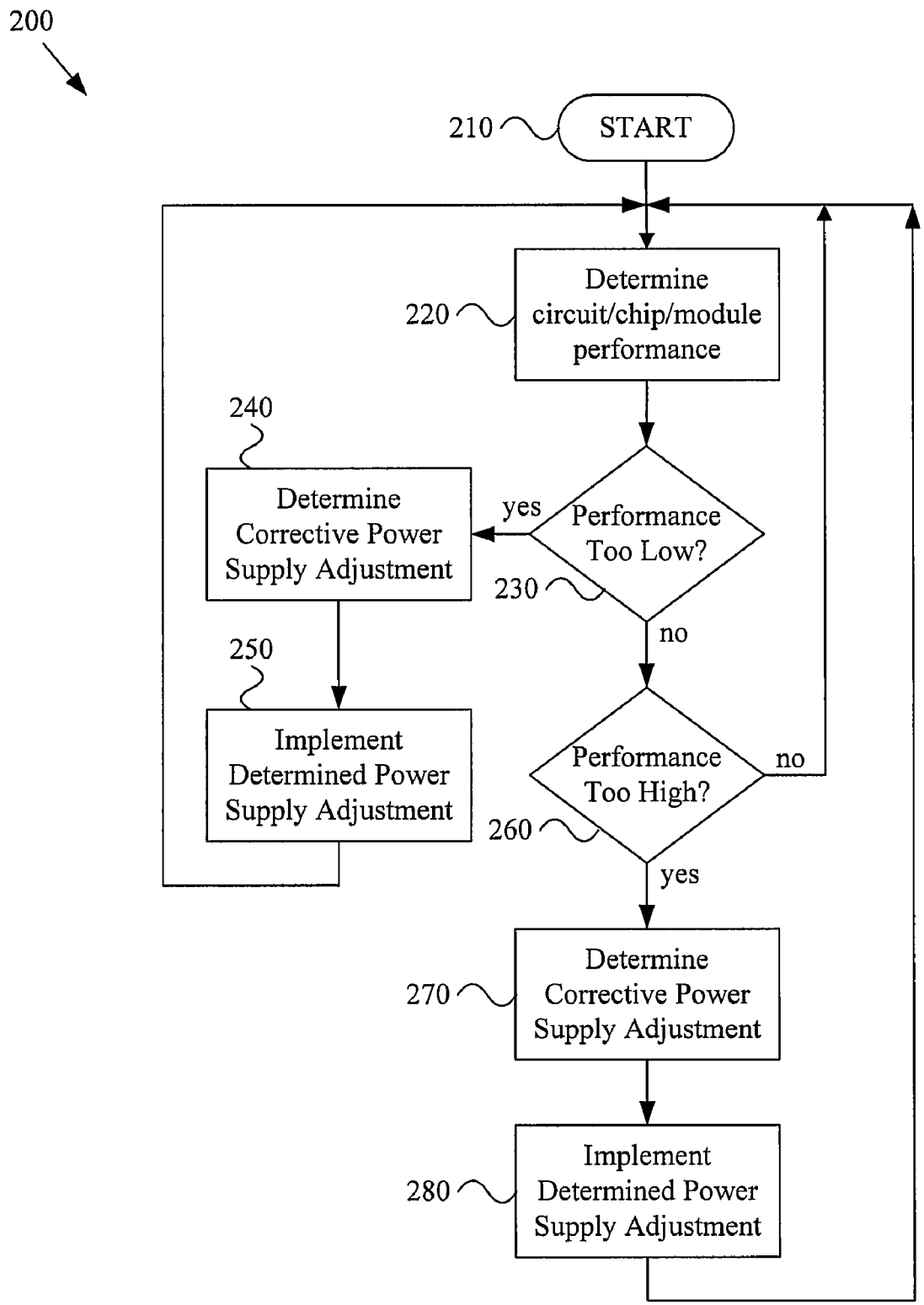
FIG. 2 illustrates an exemplary method for providing a desired electrical circuit performance level in an energy efficient manner, in accordance with various aspects of the present invention.

FIG. 2 illustrates an exemplary method 200 for providing a desired electrical circuit performance level in an energy efficient manner, in accordance with various aspects of the present invention. Various aspects of the exemplary method 200 may, for example and without limitation, share various characteristics with the exemplary method 100 illustrated in FIG. 1 and discussed previously.

The exemplary method 200 may begin at step 210. The exemplary method 200 may begin for any of a large variety of reasons. For example and without limitation, the exemplary method 200 may begin for any of the reasons discussed previously with regard to the exemplary method 100 illustrated in FIG. 1.

The exemplary method 200 may, at step 215, comprise operating an electrical circuit at a current level of performance and a current level of energy efficiency (e.g., by providing the electrical circuit with electrical power characterized by a current set of power characteristics). Step 215 may, for example and without limitation, share various characteristics with exemplary method 100 (e.g., step 120) illustrated in FIG. 1 and discussed previously. For example and without limitation, step 215 may comprise operating the electrical circuit at the current level of performance and at the current level of energy efficiency by controlling the current set of power characteristics of the electrical power provided to the electrical circuit.

The exemplary method 200 may, at step 220, comprise determining the current performance level of the electrical circuit. Step 220 may, for example and without limitation, share various characteristics with the exemplary method 100 (e.g., step 130) illustrated in FIG. 1 and discussed previously.

Step 220 may comprise determining the current performance level of the electrical circuit in any of a variety of manners. For example and without limitation, step 220 may comprise determining a processing speed of the electrical circuit. For example, step 220 may comprise determining a temperature of the electrical circuit. Also for example, step 220 may comprise determining a data processing rate of the electrical circuit. Such a data processing rate determination may, for example, be based on signal encoding/decoding strategy, communication protocol characteristics, identity of the communication source, a requested data rate, determined data rate, etc. Step 220 may, for example, comprise monitoring or otherwise determining an input data rate to the electrical circuit. Further for example, step 220 may comprise monitoring or otherwise determining an output data rate from the electrical circuit. Step 220 may also, for example, comprise monitoring a data buffer state (e.g., degree of buffer fullness).

In general, step 220 may comprise determining the current performance level of the electrical circuit. Accordingly, the scope of various aspects of the present invention should not be limited by characteristics of a particular performance level or particular manner in which a performance level for an electrical circuit may be determined.

The method 200 may, at step 230, comprise determining if the performance level is too low. Step 230 may, for example, share various aspects with the exemplary method 100 (e.g., step 140) illustrated in FIG. 1 and discussed previously.

For example and without limitation, step 230 may comprise comparing the current performance level (e.g., as determined at step 220) to a desired level of performance. As discussed previously, the desired level of performance may comprise any of a variety of characteristics of electrical circuit performance. For example, the desired level of performance may be predetermined or determined in real-time. Also for example, the desired level of performance may correspond to a single performance level or a range of performance levels. Further for example, the desired level of performance may be static or dynamic.

In an exemplary scenario where step 230 comprises determining the desired performance level, step 230 may comprise determining the desired performance level based, for example, on current and/or predicted performance needs. Step 230 may, for example, comprise determining the desired performance level based on a desired signal processing speed, desired clock rate, data access time, bit rate, input data rate, output data rate, etc.

If, for example, the current performance level determined at step 220 is too low relative to the desired performance level, then execution of the method 200 may flow to step 240, where a corrective power supply adjustment may be determined. Alternatively, for example, if the current performance level is not too low relative to the desired performance level, then the execution of the method 200 may flow to step 260 for further comparison.

In general, step 230 may comprise determining if the current performance level is too low. Accordingly, the scope of various aspects of the present invention should not be limited by characteristics of a particular performance level or manner of determining a performance level.

The method 200 may, at step 240, comprise determining a corrective power supply adjustment with which to enhance the performance of the electrical circuit. Step 240 may, for example and without limitation, share various characteristics with the exemplary method 100 (e.g., step 160) illustrated in FIG. 1 and discussed previously.

Such an power supply adjustment may, for example, comprise a predetermined change in at least one of the current set of power characteristics. Also for example, step 240 may comprise determining such an adjustment based on a profile of electrical circuit performance versus power characteristic(s). Further for example, such an adjustment may be expressed in relative or absolute terms.

In an exemplary scenario, step 240 may determine that a 0.1 Volt increase in voltage provided to the electrical circuit may result in the electrical circuit operating at the desired performance level. In another exemplary scenario, step 240 may determine that the electrical circuit may operate at the desired performance level with a supplied voltage having a lower degree of ripple and noise. Note that the two previous exemplary scenarios should by no means limit the scope of various aspects of the present invention.

Further for example, step 240 may comprise determining a power characteristic adjustment based on power supply needs of a plurality of electrical sub-circuits of the electrical circuit. Also for example, step 240 may comprise determining a power characteristic adjustment based on power supply needs of the electrical circuit and power supply needs of at least one other electrical circuit. As discussed previously, such determinations may, for example, be based on circuit priority, averaging, weighted averaging, overall energy efficiency optimization, etc.

Note that the power supply adjustment determined at step 240 might not improve the energy efficiency of the electrical circuit operation, and in fact, may decrease the energy efficiency.

In general, step 240 may comprise determining a corrective power supply adjustment with which to enhance the performance of the electrical circuit. Accordingly, the scope of various aspects of the present invention should not be limited by characteristics of a particular next set of power characteristics, adjustment(s) made to the current set of power characteristics, or way of determining such characteristics or adjustments.

The exemplary method 200 may, at step 250, comprise implementing the power supply adjustment determined at step 240. Step 250 may, for example and without limitation, share various characteristics with the exemplary method 100 (e.g., step 160) illustrated in FIG. 1 and discussed previously.

For example, step 250 may comprise providing the electrical circuit with electrical power in accordance with the power supply adjustment determined at step 240. Step 250 may, for example, comprise operating the electrical circuit by controlling the characteristics of the electrical power supplied to the electrical circuit. For example, step 250 may comprise generating a power control signal and communicating such a power control signal to power supply circuitry (e.g., a power management unit), where the power control signal may cause (e.g., authoritatively or influentially) the power supply circuitry to provide electrical power to the electrical circuit having the desired power supply characteristics. Such a power control signal may, for example, comprise a request or command for electrical power having a specific set of power characteristics. Alternatively, for example, such a power control signal may comprise a request or command for an adjustment to one or more of a set of power characteristics. Accordingly, the scope of various aspects of the present invention should not be limited by a particular manner of operating the electrical circuit by providing the electrical circuit with electrical power having a set of power characteristics.

The method 200 may, at step 260, comprise determining if the current performance level is too high. Step 260 may, for example, share various aspects with the exemplary method 100 (e.g., steps 140 and 150) illustrated in FIG. 1 and discussed previously.

For example and without limitation, step 260 may comprise comparing the current performance level (e.g., as determined at step 220) to a desired level of performance. The desired level of performance for the determination of step 260 may be the same level of performance utilized for the determination of step 230, but this is by no means necessary.

As discussed previously, the desired level of performance may comprise any of a variety of characteristics of electrical circuit performance. For example, the desired level of performance may be predetermined or determined in real-time. Also for example, the desired level of performance may correspond to a single performance level or a range of performance levels. Further for example, the desired level of performance may be static or dynamic.

In an exemplary scenario where step 260 comprises determining the desired performance level, step 260 may comprise determining the desired performance level based, for example, on current and/or predicted performance needs. Step 260 may, for example, comprise determining the desired performance level based on a desired signal processing speed, desired clock rate, data access time, bit rate, input data rate, output data rate, etc.

If, for example, the performance level determined at step 220 is too high relative to the desired performance level, then execution of the method 200 may flow to step 270, where a corrective power supply adjustment may be determined. Alternatively, for example, if the determined performance level is not too high relative to the desired performance level, then the execution of the method 200 may flow back up to step 220 for another determination of electrical circuit performance level.

In general, step 260 may comprise determining if the current performance level is too high. Accordingly, the scope of various aspects of the present invention should not be limited by characteristics of a particular performance level or manner of determining a performance level.

The method 200, at step 270, may comprise determining a corrective power supply adjustment with which to reduce the performance of the electrical circuit (e.g., thereby providing for more energy efficient operation while still meeting performance goals). Step 270 may, for example and without limitation, share various characteristics with the exemplary method 100 (e.g., step 160) illustrated in FIG. 1 and discussed previously.

Such a power supply adjustment may, for example, comprise a predetermined change in at least one of the current set of power characteristics. Also for example, step 270 may comprise determining such an adjustment based on a profile of electrical circuit performance versus power characteristic(s). Further for example, such an adjustment may be expressed in relative or absolute terms.

In an exemplary scenario, step 270 may comprise determining a power characteristic adjustment based on power supply needs of a plurality of electrical sub-circuits of the electrical circuit. Also for example, step 270 may comprise determining a power characteristic adjustment based on power supply needs of the electrical circuit and power supply needs of at least one other electrical circuit. As discussed previously, such determinations may, for example, be based on circuit priority, averaging, weighted averaging, overall energy efficiency optimization, etc.

In general, step 270 may comprise determining a corrective power supply adjustment with which to reduce the performance of the electrical circuit (e.g., thereby providing for more energy efficient operation while still meeting performance goals). Accordingly, the scope of various aspects of the present invention should not be limited by characteristics of a particular next set of power characteristics, adjustment(s) made to the current set of power characteristics, or way of determining such characteristics or adjustments.

The method 200 may, at step 280, comprise implementing the power supply adjustment determined at step 270. Step 280 may, for example and without limitation, share various characteristics with the exemplary method 100 (e.g., step 160) illustrated in FIG. 1 and discussed previously and with step 240 discussed above.

For example, step 280 may comprise providing the electrical circuit with electrical power in accordance with the power supply adjustment determined at step 270. Step 280 may, for example, comprise operating the electrical circuit by controlling the characteristics of the electrical power supplied to the electrical circuit. For example, step 280 may comprise generating a power control signal and communicating such a power control signal to power supply circuitry (e.g., a power management unit), where the power control signal may cause (e.g., authoritatively or influentially) the power supply circuitry to output electrical power having the desired power supply characteristics. Such a power control signal may, for example, comprise a request or command for electrical power having a specific set of power characteristics. Alternatively, for example, such a power control signal may comprise a request or command for an adjustment to one or more of a set of power characteristics. Accordingly, the scope of various aspects of the present invention should not be limited by a particular manner of operating the electrical circuit by providing the electrical circuit with electrical power having a set of power characteristics.

Figure 3:
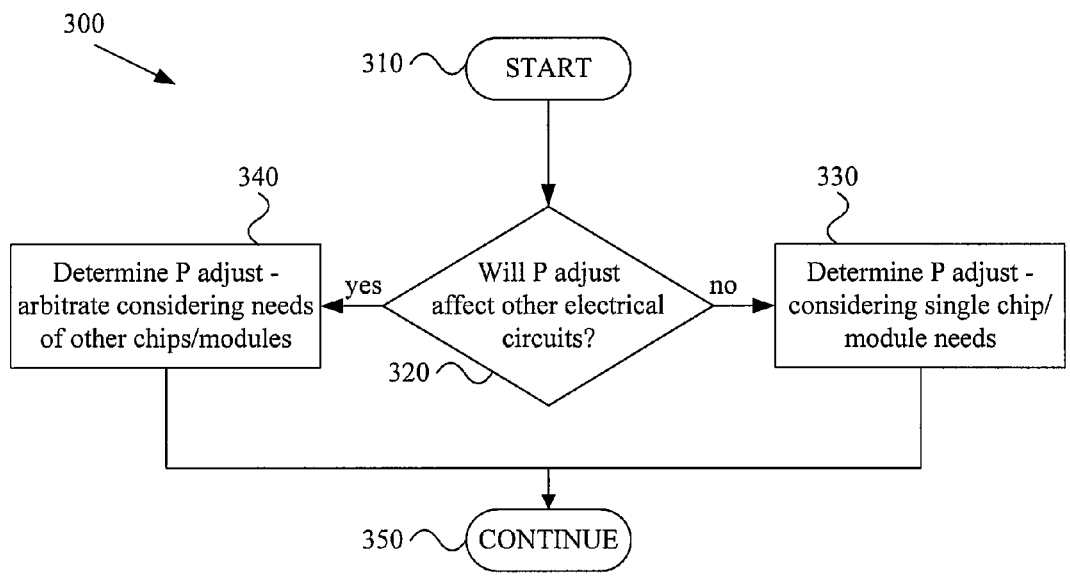
FIG. 3 illustrates an exemplary method for determining a power adjustment, in accordance with various aspects of the present invention.

FIG. 3 illustrates an exemplary method 300 for determining a power adjustment, in accordance with various aspects of the present invention. The exemplary method 300 may share various aspects with the exemplary methods 100 (e.g., step 160) and 200 (e.g., steps 240 and 270) illustrated in FIGS. 1-2 and discussed previously. The exemplary method 300 starts at step 310.

As mentioned previously, determination of power adjustment characteristics may comprise considering power supply needs for a single electrical circuit or a plurality of electrical circuits and/or sub-circuits. For example and without limitation, electrical circuits (e.g., chips, modules, or other discrete components) on a common power supply line may have conflicting performance goals or may have common performance goals. For example, in a scenario where two chips are working tightly together to perform signal processing, the chips may have common performance goals. For example, in a scenario where a first chip performs heavy processing in a first mode and light processing in a second mode, while a second chip or module performs light processing in the first mode and heavy processing in the second mode, the chips may have disparate performance goals.

The exemplary method 300 shows two exemplary scenarios. The exemplary method 300, at step 320, may determine whether adjusting characteristics of power supplied to the electrical circuit will significantly affect other electrical circuits. If step 320 determines that adjusting the characteristics of power supplied to the electrical circuit will not significantly affect the operation of other circuits, then the execution of the method 300 may flow to step 330. If, however, step 320 determines that adjusting the characteristics of power supplied to the electrical circuit will significantly affect the operation of other circuits, then the execution of the method 300 may flow to step 340.

The method 300, at step 330, may comprise determining an adjustment to one or more power characteristics based only on the performance requirements of the electrical circuit. The method 300, at step 340, may comprise determining an adjustment to one or more power characteristics by arbitrating between the performance and/or power supply needs of the electrical circuit and the other electrical circuits that would be significantly be affected by changed power characteristics.

Such arbitration may be based on any of a plurality of arbitration strategies or methods. For example, arbitration may be based on electrical circuit priority. Such priority may, for example, change depending on present system operating conditions. Arbitration may consider priority in a variety of manners, including for example, winner-take-all or weighted averaging. Arbitration may, for example, be based on need. Such arbitration may, for example consider need in a variety of manners, including for example, providing power based on the power supply needs of the most needy electrical circuit(s) or utilizing an indicating of need in a weighted averaging scheme. Arbitration may also consider overall performance and/or energy efficiency of the plurality of electrical circuits. Of course, the arbitration may utilize any of a large number of arbitration strategies.

In general, step 340 may comprise arbitrating between power supply and/or performance needs of a plurality of electrical circuits. Accordingly, the scope of various aspects of the present invention should not be limited by a particular arbitration strategy or method. Following execution of step 330 or step 340, execution of the exemplary method 300 may generally continue at step 350.

Figure 4:
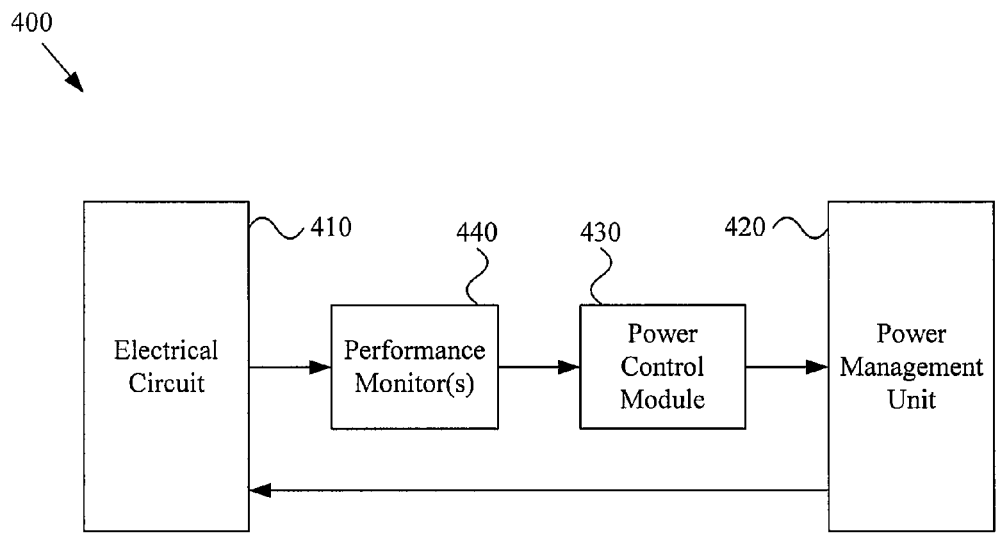
FIG. 4 illustrates an exemplary system that provides a desired electrical circuit performance level in an energy efficient manner, in accordance with various aspects of the present invention.

FIG. 4 illustrates an exemplary system 400 that provides a desired electrical circuit performance level in an energy efficient manner, in accordance with various aspects of the present invention. Various components of the system 400 illustrated in FIG. 4 may, for example and without limitation, perform various aspects of the methods 100, 200 and 300 illustrated in FIGS. 1-3 and discussed previously.

The following discussion may refer to a variety of modules and other system components. It must be noted that such modules may be implemented with hardware, software or any combination thereof. Further, modules may share various functional components. For example and without limitation, a first module may share various processing circuitry with a second module. Also for example, a first module may share all hardware with a second module. Further for example, a first module may share various software routines with a second module. Accordingly, the scope of various aspects of the present invention should not be limited by arbitrary boundaries between modules or other system components.

Operation of the exemplary system 400 may be initiated in response to any of a variety of causes or conditions. For example and without limitation, the system 400 may begin operating on start-up, power-up or reset. Additionally, for example, the system 400 may begin performance control operation in response to a condition detected in the system 400 or circuit that warrants an assessment of energy utilization in the system 400. The system 400 may, for example, operate once, periodically, or continuously. In general, the system 400 may begin operating for any of a variety of reasons and may continue operating in any of a variety of modes. Accordingly, the scope of various aspects of the present invention should not be limited by characteristics of particular initiating conditions, causes, or events, or by characteristics of various forms of continued operation.

The exemplary system 400 may comprise an electrical circuit 410. The electrical circuit 410 may comprise characteristics of any of a large variety of electrical circuits and systems. For example and without limitation, the electrical circuit 410 may be an integrated circuit or a module of a multi-module integrated circuit. The electrical circuit 410 may comprise a plurality of integrated circuits and/or other discrete electrical components. The electrical circuit 410 may comprise any of a large variety of electrical circuit types (e.g., a signal processor, decoder, encoder, converter, transmitter, receiver, microprocessor, microcontroller, audio/video driver, etc.). Accordingly, the scope of various aspects of the present invention should not be limited by characteristics of one or more particular electrical circuits.

The exemplary system 400 may comprise an electrical power supply 420 (e.g., a power management unit). The electrical power supply 420 may, for example, provide electrical power to the electrical circuit 410 and/or a variety of other electrical circuits. The electrical power supply 420 may provide electrical power to the electrical circuit 410, where the electrical power is characterized by a set of power characteristics.

The set of power characteristics may comprise any of a large variety of electrical power characteristics. For example and without limitation, the set of power characteristics may comprise a voltage level, current level and/or power level. The set of power characteristics may, for example, comprise a voltage and/or current ripple or other variance level. The set of power characteristics may, for example, comprise voltage and/or current load response characteristics. Further for example, the set of power characteristics may comprise voltage noise characteristics. Also for example, the set of power characteristics may comprise general power or energy characteristics. Accordingly, the scope of various aspects of the present invention should not be limited by aspects of one or more particular power characteristics.

The exemplary system 400 may comprise a power control module 430. The power control module 430 may control (e.g., authoritatively or influentially) the characteristics of electrical power provided to the electrical circuit 410 by the electrical power supply 420. The power control module 430 may, for example and without limitation, perform many of the various aspects of the exemplary methods 100-300 (e.g., 120, 140-160, 230-280 and 320-340) illustrated in FIGS. 1-3 and discussed previously.

In an exemplary control scenario, the power control module 430 may operate the electrical circuit 410 at a current level of performance and a current level of energy efficiency by controlling the electrical power supply 420 to provide electrical power to the electrical circuit 410, where the electrical power is characterized by a current set of power characteristics. For example and without limitation, the power control module 430 may generate a power control signal and communicate such a power control signal to the electrical power supply 420 (e.g., a power management unit), where the power control signal may cause the electrical power supply 420 to output electrical power to the electrical circuit 410, where the electrical power is characterized by the current set of power characteristics.

Such a power control signal may, for example, comprise a request or command for electrical power having a specific set of power characteristics. Alternatively, for example, such a power control signal may comprise a request or command for an adjustment to one or more of a set of power characteristics. Accordingly, the scope of various aspects of the present invention should not be limited by a particular manner of controlling the electrical power supply 420 to provide electrical power to the electrical circuit 410 that is characterized by a set of power characteristics.

The exemplary system 400 may comprise a performance monitor 440 that determines level of performance of the electrical circuit 410. The performance monitor 440 may, for example and without limitation, perform various aspects of the exemplary methods 100, 200 (e.g., steps 130 and 220) illustrated in FIGS. 1-2 and discussed previously.

The performance monitor 440 may determine the level of performance of the electrical circuit 410 in any of a variety of manners and using any of a variety of apparatus and/or techniques. For example and without limitation, the performance monitor 440 may determine a processing speed of the electrical circuit 410. For example, the performance monitor 440 may determine a temperature of the electrical circuit 410. Also for example, the performance monitor 440 may determine a data processing rate of the electrical circuit 410. Such a data processing rate determination may, for example, be based on signal encoding/decoding strategy, communication protocol characteristics, identity of the communication source, a requested data rate, determined data rate, etc. The performance monitor 440 may, for example, monitor or otherwise determine an input data rate to the electrical circuit 410. Further for example, the performance monitor 440 may monitor or otherwise determine an output data rate from the electrical circuit 410. The performance monitor 440 may also, for example, monitor a data buffer state (e.g., degree of buffer fullness) to ascertain the level of performance of the electrical circuit 410.

Continuing the exemplary control scenario discussed previously, the performance monitor 440 may determine a current level of performance of the electrical circuit 410, where the electrical circuit 410 is being provided with electrical power characterized by the current set of power characteristics.

In general, the performance monitor 440 may determine the level of performance at which the electrical circuit 410 is operating. Accordingly, the scope of various aspects of the present invention should not be limited by characteristics of a particular manner in which the performance monitor 440 may determine the level of performance for an electrical circuit.

The power control module 430 may compare a level of performance (e.g., as determined by the performance monitor 440) to a desired level of performance. Such a desired level of performance may comprise any of a variety of characteristics of electrical circuit performance. For example and without limitation, the desired level of performance may comprise any of the indications of performance discussed previously with regard to the performance monitor 440. The desired level of performance may, for example, be a static or relatively static performance level. Such a static level of performance may, for example, be predetermined (i.e., determined prior to system 400 run time). The desired level of performance may, for example, be dynamic. Such a dynamic level of performance may be determined in real-time (e.g., in response to an operating condition, continually, etc.) or non-real-time. The desired level of performance may correspond to a single performance level or a range of performance levels.

For example and without limitation, where the power control module 430 determines a desired performance level, the power control module may determine the desired performance level based, for example, on current and/or predicted performance needs. The power control module 430 may, for example, determine the desired performance level based on a desired signal processing speed. Also for example, the power control module 430 may determine the desired performance level based, at least in part, on a desired clock rate, data access time, bit rate, input data rate, output data rate, etc.

Continuing the exemplary scenario discussed previously, the power control module 430 may compare the current level of performance, as determined by the performance monitor 440, to the desired level of performance.

In general, the power control module 430 may compare a level of performance to a desired level of performance, which the power control module 430 may determine. Accordingly, the scope of various aspects of the present invention should not be limited by characteristics of a particular performance level or manner of determining a performance level.

The power control module 430 may also determine whether to modify the operation of the electrical circuit 410 based on the above-mentioned performance level comparison. If, for example, the performance level of the electrical circuit is not too high relative to the desired performance level, then the power control module 430 may determine not to modify the operation of the electrical circuit 410. Alternatively, for example, if the performance level of the electrical circuit 410 is too high relative to the desired performance level, then the power control module 430 may act to modify the operation of the electrical circuit 410.

Continuing the exemplary scenario discussed previously, the power control module 430 may, for example, operate the electrical circuit 410 at a next level of performance that is different than the current level of performance and at a next level of energy efficiency that is different than the current level of energy efficiency. The power control module 430 may, for example, operate the electrical circuit 410 at the next level of performance by causing the electrical power supply 420 to provide the electrical circuit 410 with electrical power characterized by a next set of power characteristics that is different than the current set of power characteristics.

The next set of power characteristics may comprise any of the power characteristics discussed previously with regard to the current set of power characteristics. For example and without limitation, the next set of power characteristics may comprise one or more different voltage characteristics (e.g., voltage level, noise level, variance, ripple, load response) than the current set of power characteristics. Also for example, the next set of power characteristics may comprise one or more different electrical current characteristics (e.g., electrical current level, noise, spike attenuation, ripple, load response, etc.). Further for example, the next set of power characteristics may comprise one or more power or energy characteristics that are different than the current set of power characteristics. Accordingly, the scope of various aspects of the present invention should not be limited by particular power characteristics or differences between power characteristics.

As mentioned previously, the power control module 430 may operate the electrical circuit 410 at the next level of performance by causing the electrical power supply 420 to provide the electrical circuit 410 with electrical power characterized by a next set of power characteristics. For example and without limitation, the power control module 430 may generate a power control signal and communicate such a power control signal to the electrical power supply 420 (e.g., a power management unit), where the power control signal may cause (e.g., command or influence) the electrical power supply 420 to output electrical power having the next set of power characteristics. Such a power control signal may, for example, comprise a request or command for electrical power having a specific set of power characteristics. Alternatively, for example, such a power control signal may comprise a request or command for an adjustment to one or more of a set of power characteristics. Accordingly, the scope of various aspects of the present invention should not be limited by a particular manner of operating the electrical circuit 410 by providing the electrical circuit 410 with electrical power having a set of power characteristics.

In controlling the characteristics of the electrical power being provided to the electrical circuit 410, the power control module 430 may, for example, determine an adjustment to the current set of power characteristics describing the electrical power currently provided to the electrical circuit 410. Such an adjustment may, for example, comprise a predetermined change in at least one of the current set of power characteristics. Also for example, the power control module 430 may determine such an adjustment based on a profile of electrical circuit 410 performance versus power characteristic(s). Further for example, such an adjustment may be expressed in relative or absolute terms.

For a non-limiting example, the power control module 430 may determine that a 0.1 Volt reduction in voltage provided to the electrical circuit 410 may still provide for the electrical circuit 410 to operate at or above the desired performance level while resulting in higher energy efficiency. Alternatively, for example, the power control module 430 may determine that the electrical circuit 410 may operate with a supplied voltage having a higher degree of ripple while still operating at or above the desired performance level. For example, such operation may correspond to lower switching loss in the electrical power supply 420.

The power control module 430 may, for example, determine a power characteristic adjustment based on power supply needs of a plurality of electrical sub-circuits of the electrical circuit 410. For example, the electrical circuit 410 may comprise a plurality of modules, each with respective power supply needs, and the power control module 430 may process the respective power supply needs of the modules to determine the power characteristic adjustment. Such processing may, for example and without limitation, comprise determining the power characteristic adjustment based on the needs of the highest priority module, based on a weighted average of module priority and/or need, based on a straight average, or based on a determination of optimal overall energy efficiency for the plurality of modules at the desired performance level.

The power control module 430 may, for example, determine a power characteristic adjustment based on power supply needs of the electrical circuit 410 and power supply needs of one or more other electrical circuits. For example, the electrical circuit 410 and other electrical circuit(s) may receive electrical power from the same electrical power supply 420, and accordingly, adjustments in the power characteristics of the power that the electrical circuit 410 receives from the electrical power supply 420 will affect the power characteristics of the power that the other electrical circuit(s) receive from the electrical power supply 420. The power control module 430 may, for example, process the respective power supply needs of the electrical circuit(s) to determine the power characteristic adjustment based on the needs of the electrical circuit 410 and the other electrical circuit(s). Such processing may, for example and without limitation, comprise determining the power characteristic adjustment based on the needs of the highest priority circuit, based on a weighted average of circuit priority and/or need, based on a straight average, or based on a determination of optimal energy efficiency for the plurality of electrical circuits at the desired performance level.

In general, the power control module 430 may, for example, determine an adjustment to the current set of power characteristics. Accordingly, the scope of various aspects of the present invention should not be limited by characteristics of a particular next set of power characteristics, adjustment(s) made to the current set of power characteristics, or way of determining such characteristics or adjustments.

It should be noted that the exemplary system 400 shown in FIG. 4 provides a specific illustration of various generally broader aspects of the present invention. Accordingly, the scope of various aspects of the present invention should by no means be limited by characteristics of the exemplary system 400. For example and without limitation, various components (or modules) of the exemplary system 400 may be integrated or may be discrete components. Further for example, various aspects of the present invention may be performed by hardware, a processor executing software instructions, or a combination thereof. Accordingly, the scope of various aspects of the present invention should not be limited by characteristics of any particular hardware and/or software implementation.

In summary, various aspects of the present invention provide a system and method for meeting performance goals in an electronic system in an energy efficient manner. Refer to the attached description and drawings for additional information.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for providing energy-efficient operation of electrical circuitry, the method comprising:
   operating an electrical circuit at a current level of performance and a current level of energy efficiency by, at least in part, providing the electrical circuit with electrical power characterized by a current set of power characteristics;
   determining, based at least in part on the current level of performance, to operate the electrical circuit at a next level of performance, which is lower than the current level of performance, and a next level of energy efficiency, which is higher than the current level of energy efficiency, by at least in part providing the electrical circuit with electrical power characterized by a next set of power characteristics, said determining comprising arbitrating between needs of the electrical circuit and one or more other electrical circuits; and
   providing the electrical circuit with electrical power characterized by the next set of power characteristics.

2. The method of claim 1, wherein arbitrating between needs of the electrical circuit and one or more other electrical circuits comprises arbitrating between power supply needs of the electrical circuit and the one or more other electrical circuits.

3. The method of claim 1, wherein arbitrating between needs of the electrical circuit and one or more other electrical circuits comprises arbitrating between performance needs of the electrical circuit and the one or more other electrical circuits.

4. The method of claim 1, wherein arbitrating between needs of the electrical circuit and one or more other electrical circuits comprises arbitrating between needs of the electrical circuit and the one or more other electrical circuits based, at least in part, on priority.

5. The method of claim 1, wherein arbitrating between needs of the electrical circuit and one or more other electrical circuits comprises arbitrating between needs of the electrical circuit and the one or more other electrical circuits based, at least in part, on weighted averaging.

6. A system for providing energy-efficient operation of electrical circuitry, the system comprising:
   at least one module adapted to, at least:
      operate an electrical circuit at a current level of performance and a current level of energy efficiency by, at least in part, directing electrical power supply circuitry to provide the electrical circuit with electrical power characterized by a current set of power characteristics;
      determine, based at least in part on the current level of performance, to operate the electrical circuit at a next level of performance, which is lower than the current level of performance, and a next level of energy efficiency, which is higher than the current level of energy efficiency, by at least in part providing the electrical circuit with electrical power characterized by a next set of power characteristics, said determining comprising arbitrating between needs of the electrical circuit and one or more other electrical circuits; and direct the electrical power supply circuitry to provide the electrical circuit with electrical power characterized by the next set of power characteristics.

7. The system of claim 6, wherein the at least one module is adapted to arbitrate between needs of the electrical circuit and one or more other electrical circuits by, at least in part, arbitrating between power supply needs of the electrical circuit and the one or more other electrical circuits.

8. The system of claim 6, wherein the at least one module is adapted to arbitrate between needs of the electrical circuit and one or more other electrical circuits by, at least in part, arbitrating between performance needs of the electrical circuit and the one or more other electrical circuits.

9. The system of claim 6, wherein the at least one module is adapted to arbitrate between needs of the electrical circuit and one or more other electrical circuits by, at least in part, arbitrating between needs of the electrical circuit and the one or more other electrical circuits based, at least in part, on priority.

10. The system of claim 6, wherein the at least one module is adapted to arbitrate between needs of the electrical circuit and one or more other electrical circuits by, at least in part, arbitrating between needs of the electrical circuit and the one or more other electrical circuits based, at least in part, on weighted averaging.

11. A method for providing energy-efficient operation of electrical circuitry, the method comprising:

operating an electrical circuit at a current level of performance and a current level of energy efficiency by, at least in part, providing the electrical circuit with electrical power characterized by a current set of power characteristics, the current set of power characteristics comprising a current voltage level;

determining, based at least in part on the current level of performance, to operate the electrical circuit at a next level of performance, which is lower than the current level of performance, and a next level of energy efficiency, which is higher than the current level of energy efficiency, by at least in part providing the electrical circuit with electrical power characterized by a next set of power characteristics different from the current set of power characteristics, the next set of power characteristics comprising a next voltage level that is substantially equal to the current voltage level; and providing the electrical circuit with electrical power characterized by the next set of power characteristics.

12. The method of claim 11, wherein the current set of power characteristics comprises a current amount of voltage ripple, and the next set of power characteristics comprises a next amount of voltage ripple different from the current amount of voltage ripple.

13. The method of claim 11, wherein the current set of power characteristics comprises a current amount of voltage variance, and the next set of power characteristics comprises a next amount of voltage variance different from the current amount of voltage variance.

14. The method of claim 11, wherein operating the electrical circuit at the current level of performance comprises providing a current power control signal to power supply circuitry to cause the power supply circuitry to provide electrical power characterized by the current set of power characteristics to the electrical circuit, and operating the electrical circuit at the next level of performance comprises providing a next power control signal to power supply circuitry to cause the power supply circuitry to provide electrical power characterized by the next set of power characteristics to the electrical circuit.

15. The method of claim 11, wherein determining, based at least in part on the current level of performance, to operate the electrical circuit at a next level of performance and a next level of energy efficiency comprises determining, based at least in part on a current processing speed of the electrical circuit, to operate the electrical circuit at the next level of performance and the next level of energy efficiency.

16. The method of claim 11, wherein determining, based at least in part on the current level of performance, to operate the electrical circuit at a next level of performance and a next level of energy efficiency comprises determining, based at least in part on a current data processing rate of the electrical circuit, to operate the electrical circuit at the next level of performance and the next level of energy efficiency.

17. The method of claim 11, wherein determining, based at least in part on the current level of performance, to operate the electrical circuit at a next level of performance and a next level of energy efficiency comprises determining, based at least in part on power supply needs of the electrical circuit and power supply needs of at least one other electrical circuit, to operate the electrical circuit at the next level of performance and the next level of energy efficiency.

18. The method of claim 11, further comprising determining, based at least in part on the current level of performance, to operate the electrical circuit at a third level of performance and a third level of energy efficiency by, at least in part, providing the electrical circuit with electrical power characterized by a third set of power characteristics different from the current and next sets of power characteristics, where the third level of performance is higher than the current level of performance.

19. The method of claim 11, wherein the current and next levels of energy efficiency reflect energy efficiency of only the electrical circuit.

20. The method of claim 11, wherein the current and next levels of energy efficiency reflect energy efficiency of at least the electrical circuit and power supply circuitry coupled to the electrical circuit.

21. The method of claim 11, further comprising determining the next set of power characteristics based, at least in part, on a predetermined change to one or more of the current set of power characteristics.

22. The method of claim 11, further comprising determining the next set of power characteristics based, at least in part, on a circuit performance profile.

23. The method of claim 11, wherein determining, based at least in part on the current level of performance, to operate the electrical circuit at a next level of performance and a next level of energy efficiency comprises determining, based at least in part on a desired level of performance, to operate the electrical circuit at the next level of performance and the next level of energy efficiency.

24. The method of claim 23, wherein the desired level of performance is dynamic.

25. The method of claim 23, further comprising determining the desired level of performance in real-time.

26. A system for providing energy-efficient operation of electrical circuitry, the system comprising:

at least one module adapted to, at least:

operate an electrical circuit at a current level of performance and a current level of energy efficiency by, at least in part, directing electrical power supply circuitry to provide electrical power to the electrical circuit, the electrical power characterized by a current voltage level;

determine, based at least in part on the current level of performance, to operate the electrical circuit at a next level of performance, which is lower than the current level of performance, and a next level of energy efficiency, which is higher than the current level of energy efficiency, by at least in part providing the electrical circuit with electrical power characterized by a next set of power characteristics different from the current set of power characteristics, the next set of power characteristics comprising a next voltage level that is substantially equal to the current voltage level; and direct the electrical power supply circuitry to provide the electrical circuit with electrical power characterized by the next set of power characteristics.

27. The system of claim 26, wherein the current set of power characteristics comprises a current amount of voltage ripple, and the next set of power characteristics comprises a next amount of voltage ripple different from the current amount of voltage ripple.

28. The system of claim 26, wherein the current set of power characteristics comprises a current amount of voltage variance, and the next set of power characteristics comprises a next amount of voltage variance different from the current amount of voltage variance.

29. The system of claim 26, wherein the at least one module is adapted to determine, based at least in part on the current level of performance, to operate the electrical circuit at a next level of performance and a next level of energy efficiency by determining, based at least in part on a current processing speed of the electrical circuit, to operate the electrical circuit at the next level of performance and the next level of energy efficiency.

30. The system of claim 26, wherein the at least one module is adapted to determine, based at least in part on the current level of performance, to operate the electrical circuit at a next level of performance and a next level of energy efficiency by determining, based at least in part on a current data processing rate of the electrical circuit, to operate the electrical circuit at the next level of performance and the next level of energy efficiency.

31. The system of claim 26, wherein the at least one module is adapted to determine to operate the electrical circuit at a next level of performance and a next level of energy efficiency based, at least in part, on power supply needs of the electrical circuit and power supply needs of at least one other electrical circuit.

32. The system of claim 26, wherein the at least one module is further adapted to determine, based at least in part on the current level of performance, to operate the electrical circuit at a third level of performance and a third level of energy efficiency by, at least in part, providing the electrical circuit with electrical power characterized by a third set of power characteristics different from the current and next sets of power characteristics, where the third level of performance is higher than the current level of performance.

33. The system of claim 26, wherein the current and next levels of energy efficiency reflect energy efficiency of only the electrical circuit.

34. The system of claim 26, wherein the current and next levels of energy efficiency reflect energy efficiency of at least the electrical circuit and power supply circuitry coupled to the electrical circuit.

35. The system of claim 26, wherein the at least one module is adapted to determine the next set of power characteristics based, at least in part, on a predetermined change to one or more of the current set of power characteristics.

36. The method of claim 26, wherein the at least one module is adapted to determine the next set of power characteristics based, at least in part, on a circuit performance profile.

37. The method of claim 26, wherein the electrical circuit is an integrated circuit.

38. The system of claim 26, wherein the at least one module is adapted to determine, based at least in part on the current level of performance, to operate the electrical circuit at a next level of performance and a next level of energy efficiency by determining, based at least in part on a desired level of performance, to operate the electrical circuit at a next level of performance and a next level of energy efficiency.

39. The system of claim 38, wherein the desired level of performance is dynamic.

40. The system of claim 38, wherein the at least one module is adapted to determine the desired level of performance in real-time.

* * * * *